United States Patent [19]
Moriyama

[11] 3,838,301
[45] Sept. 24, 1974

[54] ELECTRIC MACHINE WITH FLYWHEEL-FAN

[75] Inventor: Kazuyoshi Moriyama, Hitachi, Japan

[73] Assignee: Hitachi, Ltd., Tokyo, Japan

[22] Filed: Feb. 9, 1973

[21] Appl. No.: 331,075

[52] U.S. Cl.................. 310/60, 310/63, 310/74
[51] Int. Cl...................... H02k 9/00, H02k 9/06
[58] Field of Search............ 310/59, 74, 67, 62, 63, 310/60

[56] References Cited
UNITED STATES PATENTS
1,963,855  6/1934  Kratz.............................. 310/74 UX FOREIGN PATENTS OR APPLICATIONS
1,129,224  5/1962  Germany............................. 310/59

Primary Examiner—J. D. Miller
Assistant Examiner—Robert J. Hickey
Attorney, Agent, or Firm—Craig & Antonelli

[57] ABSTRACT

In an electric machine having a flywheel, such as a clutch motor, blades are integrally formed on one main surface of the flywheel, and a fan casing is formed in the end bracket of the machine, which casing has perforations for air inhalation and exhalation, so that the machine may be provided with the function of a blower without making any substantial change in its structure.

6 Claims, 3 Drawing Figures

3,838,301

ELECTRIC MACHINE WITH FLYWHEEL-FAN

BACKGROUND OF THE INVENTION

1. Field of the Invention

The present invention relates to an electric machine having a flywheel, and more particularly to a clutch motor used in a sewing machine or a motor having a braking mechanism.

2. Description of the Prior Art

A clutch motor is usually used to drive a sewing machine or a small lathe which is very often stopped during work.

Power looms and wood cutting machines employ such a clutch motor. In those cases, materials to be treated are comparatively light in weight so that a pressure blower can be used to remove cut fragments, and to gather dust produced during work as well as to automatically feed the materials.

Especially, in the sewing industry or in a wood cutting factory, there is so much dust or so many tiny, microscopic cut fragments suspending in air that these contaminations will not only adversely affect the health of the workers but will also deteriorate the quality of completed products with the result that they are discarded or have to be retreated to restore their quality. In such circumstances, therefore, there is a great need for a blower to collect such dusty particles in order to improve the working environment as well as the quality of the products.

However, a machine which needs a clutch motor, e.g., a sewing machine, usually has a small size and there is no room in which a separate blower, in addition to a clutch motor as a drive motor, may be accommodated. If a special blower is attached to such a machine, the cost of the overall machine will increase to a substantial extent. Consequently, the provision of a separate blower is limited only to a machine having a large capacity. Moreover, the cost of such a blower is equal to or higher than that of the used clutch motor so that the blower is not widely used though it would contribute much to automatization, minimizing of factory hands and the prevention of contamination of the environment.

SUMMARY OF THE INVENTION

One object of the present invention is to furnish an electric machine having a flywheel with the function of a blower without making a substantial change in the structure of the machine.

Another object of the present invention is to provide a clutch motor with a blower which can be installed on an area which is at present occupied by a conventional clutch motor having the same capacity.

The structure of an embodiment of the present invention may be summed up as follows. A plurality of blades are integrally formed on one principal surface of the flywheel, a fan casing is formed in the end bracket of the motor in opposite relation to the blades, and air inhalation and exhalation ports are provided in a peripheral portion of the fan casing.

With such a structure as described above, a small-size electric machine having the function of a blower can be realized which can contribute a great deal to the sewing industry as described previously.

A high pressure blower is especially needed to automatize the process and to minimize the factory hands. A vortex blower can create a high pressure (or high vacuum) even at its lower rate of revolution. The mechanism of creating high pressure in the vortex blower is the same as that of a Westco pump.

If the blower incorporated in a clutch motor used in, for example, a sewing machine is of a high pressure type, it can serve to collect dust, to provide tension for sewing thread, to automatically feed the cloth to be sewn, and to remove fragments of the thread.

According to the present invention, in order to provide a function of a blower, a blade-shaped structure is integrally formed on one main surface of the flywheel or separately prepared blades are attached to the main surface of the flywheel which is provided in a clutch motor to store kinetic energy. It should here be noted that the thus formed blower is not for cooling the drive motor but for use with other external apparatuses and that it can serve as a separately prepared, individual blower.

DETAILED DESCRIPTION OF THE PREFERRED EMBODIMENTS

Now the present invention will be described below as applied to a clutch motor only for convenience sake, but one must not take it that the invention is limited to this case above.

Description will first be made of an embodiment wherein a vortex blower is employed. The vortex blower is especially preferred in the sewing industry, e.g., in automatic cloth feeding or in providing tension for sewing threads, since it can produce a rather high pressure at a lower rate of rotation.

Figure 2:
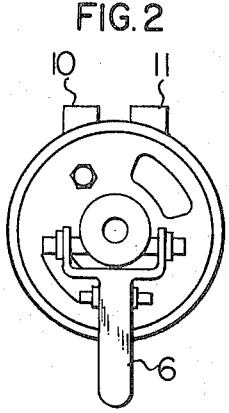
FIG. 2 is a front view, seen from the side of the attached clutch, of the machine shown in FIG. 1.
Figure 3:
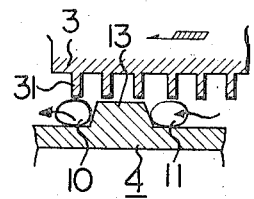
FIG. 3 is a cross-section of the machine, taken along the line III — III in FIG. 1.

However, a centrifugal fan can suffice for the purpose of merely removing the fragments of thread or dust. The present invention will now be described by way of an example through reference to FIGS. 1, 2 and 3 of the attached drawings.

Figure 1:
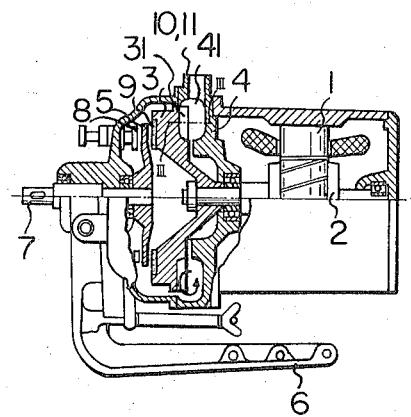
FIG. 1 is a longitudinal, partial cross-section of an electric machine embodying the present invention.

FIG. 1 shows a clutch motor to which the present invention is applied. The clutch motor is the same in constitution as one conventionally used, except for the structures of the flywheel and the bracket disposed near a load to be connected.

In FIG. 1, reference numeral 1 designates a stator, 2 a rotor and 3 a flywheel. Ten to 20 blades 31 to serve as a vortex blower are integrally formed on that surface of the flywheel 3 which is not used as a clutch surface, the blades being radially arranged. An end bracket 4 has an air passage 41. The air passage 41 is divided by a partition wall 13 into an inhalation port 10 and an exhalation port 11. When the flywheel 3 is rotated by the motor, the air within the passage 41 is drawn from the inhalation port 10 toward the exhalation port 11 by means of the blades 31 formed integrally on the flywheel 3. The moved air is then blocked by the partition wall 13 to be pushed out through the exhalation port 11. The air in a room defined between two of the blades 31, on the other hand, is pushed radially due to centrifugal force and accordingly compressed to a small extent. The radially moved volume of air is again conveyed into the next room between the blades through the air passage 41. In general, the air is compressed while moving in the direction indicated by an arrow shown in FIG. 3 and then pushed out through the exhalation port 11 as described above.

A clutch plate 5, an operating lever 6, an output shaft 7 and linings 8 and 9 are the same as in a conventional clutch motor.

According to the above embodiment, the blades 31 are formed integrally on the flywheel 3 and the end bracket 4 is provided with the air passage 41, so that a vortex blower is formed. The combination of the structures of the clutch motor and the vortex blower provide a novel function. In this embodiment the blower blades and the air passage are both the integral parts of the flywheel and the end bracket, respectively. However, one of the parts may be formed as a separate member while the other is integrally formed. In this last case, the work of assembly is more complicated and the production cost is higher than those required in the previous case. Therefore, the machine in the last case is not preferable in comparison with the previously described embodiment, but it is clear that the machine is more preferable than the one used with a separate blower.

In case where a turboblower is used, the inhalation port must be provided near the rotating shaft so that some conduit pipe is needed to guide the air from outside into the turboblower. The provision of the conduit pipe will add to the dimentions of the overall machine. Moreover, in order to create a high pressure with a turboblower a multi-stage type one has to be used since a single turboblower can only create a lower pressure. And hence, there may be increases in the dimensions and the cost.

Some variations of the embodiment of the present invention, which those skilled in the art can make easily, are as follows:

1. The vortex blower is replaced by a centrifugal blower.
2. The blades are integrally formed on the flywheel and the fan casing disposed in opposite to the blades is not formed integrally on the end bracket but prepared separately.
3. Resin-mold blades are attached to the flywheel to function as an impeller of a blower.
4. The locations of the inhalation and exhalation ports can be selected as we please.

And some of the features of the blower according to the present invention are as follows:

1. It can be applied even to any motor having a flywheel, other than a clutch motor.
2. It can be applied also to a generator. The clutch motor with the structure according to the present invention as described above, can enjoy the following effects:

1. It can serve not only as a clutch motor but as a blower which is a quite novel mechanism, with a slight increase in production cost but without any change in dimension and weight in comparison with a conventional clutch motor.
2. In a clutch motor which is operated intermittently, (even if a single motor is used) the capacity of the drive motor can be much smaller than the sum of the capacities of a clutch motor and a blower motor which are separately provided, if the capacity of the flywheel is great enough. Therefore, the necessary electric power can be decreased.
3. In the embodiment of the present invention, the mechanisms of a clutch motor and a blower are combined in a single unit so that the installation and the wiring are facilitated.
4. Since the clutch motor is used only intermittently, the composite mechanism can perform its individual functions as a clutch motor and a blower without adversely affecting each other if the flywheel has a sufficient capacity. Moreover, since the flywheel is always rotating at a constant rate, the function of the blower experiences no influence even when the mechanism is repeatedly used as a clutch motor.
5. According to the present invention, the function of a blower can be incorporated even in an electric machine which was conventionally supposed not to permit the provision of any blower from the standpoint of size, cost or weight.

In conclusion, according to the present invention, since an electric machine having a flywheel is furnished with the function of a blower the machine, whose size and cost are nearly the same as those of the conventional clutch motor, will contribute, when applied for example to textile industry, much to the automating of the actions of sucking and feeding textiles to be cut and sewn, the prevention of contamination of environment by sucking fiber dust, and the acceleration of operation by cooling needles and cutters.

Moreover, when the machine is used to drive a small-sized machine tool, it can serve to hold work pieces, to automatically feed them, to supply raw materials and to remove cut fragments. Thus, the present invention can contribute in the field of industry a great deal to the automatization, the minimization of factory hands and the prevention of contamination of environment and therefore it may be estimated valuable.

It should here be noted that the present invention is by no means limited to the embodiment described above but allows modification, variation and alteration within the scope of the invention and that it is only limited by the attached claims.

I claim:

1. An electric machine comprising:
a stator;
a rotor rotatably mounted on said stator;
a flywheel mounted on the shaft of said rotor;
a plurality of blades formed on at least one side surface of said flywheel;
a casing disposed in opposite relation to said blades to constitute a vortex blower in cooperation with said blades; and
air inhalation and exhalation ports formed in the opposite sides of a partition means disposed in an air passage provided in said casing so as to provide a high vacuum or high pressure effect thereat.

2. An electric machine according to claim 1, wherein said casing is composed of an end bracket of said electric machine, said air passage being formed in said end bracket and in opposite relation to said blades.

3. An electric machine according to claim 1, wherein clutch means is provided for selectively transmitting the torque of said flywheel to an output shaft of said electric machine, lining means is provided on one side of said flywheel in opposite relation to said clutch means and said blades are formed on the other side of said flywheel.

4. An electric machine according to claim 1, wherein the inside of said partition means communicates with the outside thereof.

5. An electric machine according to claim 1, wherein the air inhalation port side of said partition means communicates with the exhalation port side of said partition means through said blades of the vortex blower.

6. An electric machine according to claim 1, wherein said inhalation and exhalation ports are arranged for cooperation with external apparatus.

* * * * *